Nov. 7, 1961    B. A. EYER    3,007,441
TOOTH BRUSH FOR USE ON DOMESTIC ANIMALS
Filed May 18, 1959

INVENTOR
BIRD A. EYER

BY
ATTORNEYS

3,007,441
TOOTH BRUSH FOR USE ON DOMESTIC ANIMALS
Bird A. Eyer, 3409 Magnolia Blvd., Seattle, Wash.
Filed May 18, 1959, Ser. No. 813,969
2 Claims. (Cl. 119—1)

This invention relates to a tooth brush, and especially an article for brushing the teeth of domestic animals.

For its general object the invention aims to provide a tooth brush which will efficiently clean the teeth and massage the gums of a domestic animal with no irritant effects and which may be thereafter thoroughly cleaned with ease and expedition so as not to harbor any residual food particle which could produce bacteria.

It is a further and important object to provide a tooth brush, especially intended for use on animals, which will be subject to little wear in use.

The invention has the yet further object of providing an article for the described purpose characterized in that certain of the brushing teeth are so designed as to provide pockets in which to retain a paste dentifrice applied to the brush.

The above and yet additional objects and advantages in view will appear and be understood in the course of the following description and claims, the invention consisting in the novel construction and in the adaptation and combination of parts hereinafter described and claimed.

Figure 1:
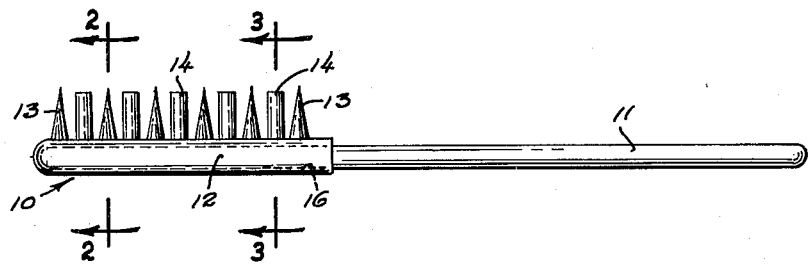
FIGURE 1 is a side elevational view of a tooth brush constructed to embody the preferred teachings of the present invention.
Figure 2:
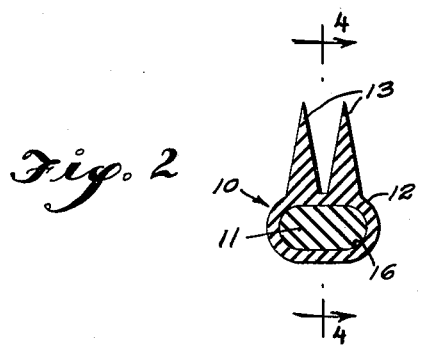
FIG. 2 is a transverse vertical sectional view drawn to an enlarged scale on line 2—2 of FIG. 1.
Figure 3:
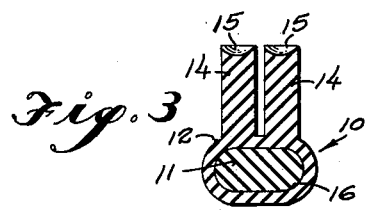
FIG. 3 is a transverse vertical sectional view drawn to an enlarged scale on line 3—3 of FIG. 1.
Figure 4:
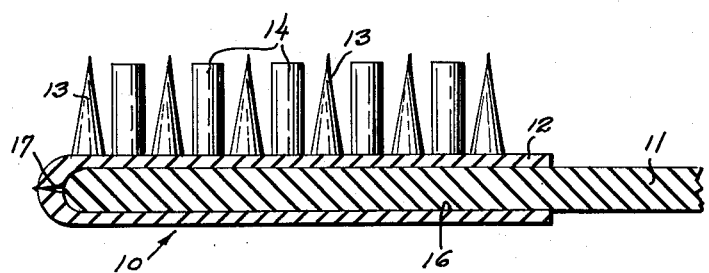
FIG. 4 is a fragmentary longitudinal vertical sectional view on line 4—4 of FIG. 2.

The brush of the present invention is a two-piece structure comprised of a brushing head designated generally by the numeral 10, and a handle 11 therefor.

The head is molded from a moderately flexible material, either rubber or plastic is suitable, to provide rows of teeth, suggesting spires, rising for a base 12. While here shown as having two parallel longitudinally extending rows of said teeth, a single said row, or three rows, could conceivably be employed. The teeth in each row alternate as between two shapes, the one, denoted by 13, being substantially conical while the other tooth 14 is cylindrical, or generally cylindrical, with its summit cupped so as to produce a concavity 15. The apices of the conical teeth 13 rise in a moderate degree above the tips of the cylindrical teeth 14.

The base 12 provides a socket 16 therein for the reception of the handle. This socket extends for very nearly the full length of the head and has an oblong configuration when considered in cross-section, the purpose being to preclude the mating handle from turning within the socket and thus permitting the user to move the tip ends of the teeth laterally by wrist motions given to the handle. The inner end of the socket has a slit 17 leading to the atmosphere, this slit being of uniform width throughout its length but diminishing in height from the inner to the outer end and terminating in slightly protruding touching lips. Such slit permits ready passage of air in only one direction and thus allows the handle to be easily inserted in the socket while resisting removal.

In the use of the article, a ribbon of tooth paste which desirably contains a bleaching agent is applied to the brush and the brush is then rubbed along the teeth of the animal. The concave recesses 15 in the tips of the cylindrical spires 14 serve two functions, (1) to hold portions of the paste sufficiently long to insure application over all of the teeth, and (2) stimulating the gums through creation of suction action as the user applies a recommended orbital motion to the head. The moderately soft nature of the material composing the teeth produces a gentle massaging action. The pointed tips of the conical spires 13 perforce work into the re-entrant openings between the teeth.

It is believed that the invention will have been clearly understood from the foregoing detailed description of the now preferred illustrated embodiment. Changes in the details of construction can be resorted to without departing from the spirit of the invention and it is accordingly my intention that no limitations be implied and that the hereto annexed claims be given a scope fully commensurate with the broadest interpretation to which the employed language fairly admits.

What I claim is:

1. A tooth brush for use on domestic animals providing a head molded from a moderately flexible material to present multiple upstanding brushing teeth and having a socket within said head open at one end and extending for very nearly the full length of the head, and a rigid handle for the head removably fitting the socket, the end wall of the head having a slit therein leading from the closed end of the socket to the atmosphere and so formed as to permit a ready outward flow of air to the atmosphere while resisting an inward flow of air to the socket.

2. Structure according to claim 1 characterized in that the exterior end of the slit normally is tightly closed so that bacteria will not be given access to the slit.

References Cited in the file of this patent

UNITED STATES PATENTS

| | | |
|---|---|---|
| 2,090,144 | Palimeri et al. | Aug. 17, 1937 |
| 2,209,173 | Russell | July 23, 1940 |
| 2,279,355 | Wilensky | Apr. 14, 1942 |
| 2,294,900 | Fuller | Sept. 8, 1942 |